United States Patent
(12) United States Patent
Hori

(10) Patent No.: US 6,899,078 B2
(45) Date of Patent: May 31, 2005

(54) STARTING DEVICE FOR INTERNAL COMBUSTION ENGINE

(75) Inventor: Yasuyoshi Hori, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/653,931

(22) Filed: Sep. 4, 2003

(65) Prior Publication Data

US 2004/0168665 A1 Sep. 2, 2004

(30) Foreign Application Priority Data

Feb. 28, 2003 (JP) ....................................... 2003-054425

(51) Int. Cl.$^7$ .......................... F02D 43/00; F02N 17/00
(52) U.S. Cl. .................. 123/305; 123/179.5; 123/182.1
(58) Field of Search .............................. 123/305, 179.5, 123/182.1

(56) References Cited

U.S. PATENT DOCUMENTS 4,191,152 A * 3/1980 Deutschmann .............. 123/560
4,312,308 A * 1/1982 Slattery ................... 123/182.1

FOREIGN PATENT DOCUMENTS

| | | |
|---|---|---|
| JP | 11-125136 A | 5/1999 |
| JP | 2002-039038 A | 2/2002 |

* cited by examiner

*Primary Examiner*—Andrew M. Dolinar
(74) *Attorney, Agent, or Firm*—Sughrue Mion, PLLC

(57) ABSTRACT

A starting device for an internal combustion engine is capable of increasing starting torque as well as supplying air to a cylinder that is on the expansion stroke without separately providing a means for supplying high-pressure air. Communication control valves control the states of communication between cylinders of the engine. A crank angle detector detects the crank angle of a crankshaft of the engine. A compression/expansion identification part identifies the compression stroke or the expansion stroke of each cylinder. Fuel is injected into a cylinder on the expansion stroke and ignited therein, and the expansion stroke cylinder is placed in communication with a cylinder on the exhaust stroke by a communication state control part for a prescribed time after the ignition thereof, after which the expansion stroke cylinder is further placed in communication with a cylinder on the compression stroke for a prescribed time.

2 Claims, 15 Drawing Sheets

FIG. 5

| | | | | | | |
|---|---|---|---|---|---|---|
| FIRST CYLINDER#1 | COMPRESSION | EXPANSION | INTAKE | EXHAUST | COMPRESSION | EXPANSION |
| SECOND CYLINDER#2 | EXPANSION | INTAKE | EXHAUST | COMPRESSION | EXPANSION | INTAKE |
| THIRD CYLINDER#3 | EXHAUST | COMPRESSION | EXPANSION | INTAKE | EXHAUST | COMPRESSION |
| FOURTH CYLINDER#4 | INTAKE | EXHAUST | COMPRESSION | EXPANSION | INTAKE | EXHAUST |
| SGC | HIGH | HIGH | | HIGH | | HIGH |
| C_SGT | 10~27 | 1~9<br>28~35 | 10~27 | 1~9<br>28~35 | 10~27 | 1~9<br>28~35 |

STARTING DEVICE FOR INTERNAL COMBUSTION ENGINE

BACKGROUND OF THE INVENTION

1. Field of the Invention

The present invention relates to a starting device for staring an internal combustion engine by directly injecting fuel into cylinders of the internal combustion engine.

2. Description of the Related Art

A known starting device for an internal combustion engine specifies a cylinder whose piston exists in a prescribed positional allowable range or tolerance that is a considerably limited angular range after the top dead center of the piston on the expansion stroke, calculates the current pressure, temperature and volume of the thus specified cylinder, also calculates, based on the values thus calculated, an optimal pulse width for the fuel of a desired air fuel ratio to be injected into the combustion chamber of the specified cylinder through a corresponding fuel injector, and sends a signal to the corresponding fuel injector so that a desired amount of fuel can be supplied to the combustion chamber of the specified cylinder, thereby igniting or firing an air fuel mixture therein to start the internal combustion engine (for instance, see a first patent document: Japanese patent application laid-open No. Hei 11-125136).

In addition, there has been known another starting device for an internal combustion engine which forcedly stops a cylinder used for self starting at the midpoint of the expansion stroke (at a crank angle of 10°–140° after top dead center), controls a variable valve timing phase mechanism by referring to information on the crank angle upon engine starting, which was stored when the engine was stopped, in such a manner that the closing timing of an intake valve is set to be at a crank angle of 10° before top dead center by delaying the phase of an intake-side valve operating cam, calculates the volume of a first cylinder (i.e., the amount of air in the first cylinder) based on the crank angle, and determines an amount of fuel to be injected so as to provide a prescribed air fuel ratio (A/F) for the amount of air thus calculated. In a third cylinder that is on the compression stroke, the compression pressure therein drops due to an intake valve of this cylinder being opened, and hence the amount of work required for compression of the air fuel mixture in the third cylinder decreases, whereby the piston in the third cylinder can pass the compression top dead center thereof to start the engine without unnecessarily decreasing the rotating force or torque generated by the combustion of the air fuel mixture in the first cylinder (for instance, see a second patent document: Japanese patent application laid-open No.2000-39038).

However, since the above-mentioned known starting devices for internal combustion engines merely reduces the compression force of a cylinder on the compression stroke, when the starting torque is to be increased for a certain purpose or when air is supplied to a cylinder on the expansion stroke, it is necessary to provide a means for supplying high-pressure air, thus giving rise to a problem that the starting devices are made complicated in structure and the cost of manufacture thereof is increased as well.

SUMMARY OF THE INVENTION

Accordingly, an object of the present invention is to provide a starting device for an internal combustion engine which is capable of increasing starting torque as well as supplying air to a cylinder that is on the expansion stroke without separately providing a means for supplying high-pressure air.

Bearing the above object in mind, in one aspect, the present invention resides in a starting device for an internal combustion engine which is provided with fuel injection valves for directly injecting fuel into a plurality of cylinders, and spark plugs for igniting fuel in the respective cylinders. The starting device includes: piping for connecting between the respective cylinders; communication control valves for controlling the states of communication between the respective cylinders and the piping; an electronic engine control unit for controlling the starting device; a crank angle detector for detecting the crank angle of a crankshaft of the internal combustion engine; and a compression/expansion identification part for identifying the compression stroke or the expansion stroke of each of the cylinders. The electronic engine control unit includes: a basic operation control part for controlling the fuel injection valves and the spark plugs; a stroke identification part for identifying the stroke of each of the cylinders from the crank angle position and an identification result of the compression stroke or the expansion stroke of each cylinder; and a communication state control part for controlling the communication control valves. In a cylinder which is identified to be on the expansion stroke by the stroke identification part, fuel is injected into the expansion stroke cylinder and ignited therein under the control of the electronic engine control unit, and the expansion stroke cylinder is placed in communication with a cylinder on the exhaust stroke by means of the communication state control part for a prescribed period of time after the ignition thereof, after which the expansion stroke cylinder is further placed in communication with a cylinder on the compression stroke for a prescribed period of time.

Therefore, the compression force of the compression stroke cylinder can be reduced, and at the same the compressed air in the compression stroke cylinder can be supplied to the expansion stroke cylinder, whereby the starting torque can be increased due to the compressed air, thereby making it possible to improve startability.

In another aspect, the present invention resides in a starting device for an internal combustion engine which is provided with fuel injection valves for directly injecting fuel into a plurality of cylinders, and spark plugs for igniting fuel in the respective cylinders. The starting device includes: piping for connecting between the respective cylinders; communication control valves for controlling the states of communication between the respective cylinders and the piping; an electronic engine control unit for controlling the starting device; a crank angle detector for detecting the crank angle of a crankshaft of the internal combustion engine; and an intake and exhaust valve electromagnetic driving device for electromagnetically opening and closing intake valves and exhaust valves of the internal combustion engine. The electronic engine control unit includes: a basic operation control part for controlling the fuel injection valves and the spark plugs; a piston operating direction determination part for determining the operating direction of a piston in each of the cylinders from the crank angle position; a stroke setting part for setting the stroke of each cylinder whose operating direction is determined by the piston operating direction determination part; a communication state control part for controlling the communication control valves; and an electromagnetic device control part for controlling the intake and exhaust valve electromagnetic driving device. Fuel is injected into a cylinder on the expansion stroke set by the stroke setting part, and ignited therein under the control of the electronic engine control unit.

Therefore, the compression force of the compression stroke cylinder can be reduced, and at the same the compressed air in the compression stroke cylinder can be supplied to the expansion stroke cylinder, whereby the starting torque can be increased due to the compressed air, thereby making it possible to improve startability.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 5 is a table showing the behaviors of respective parameters of the starting device at the times of stoppage and start of the engine.

DESCRIPTION OF THE PREFERRED EMBODIMENTS

Now, preferred embodiments of the present invention will be described below in detail while referring to the accompanying drawings.

Embodiment 1.

Figure 1:
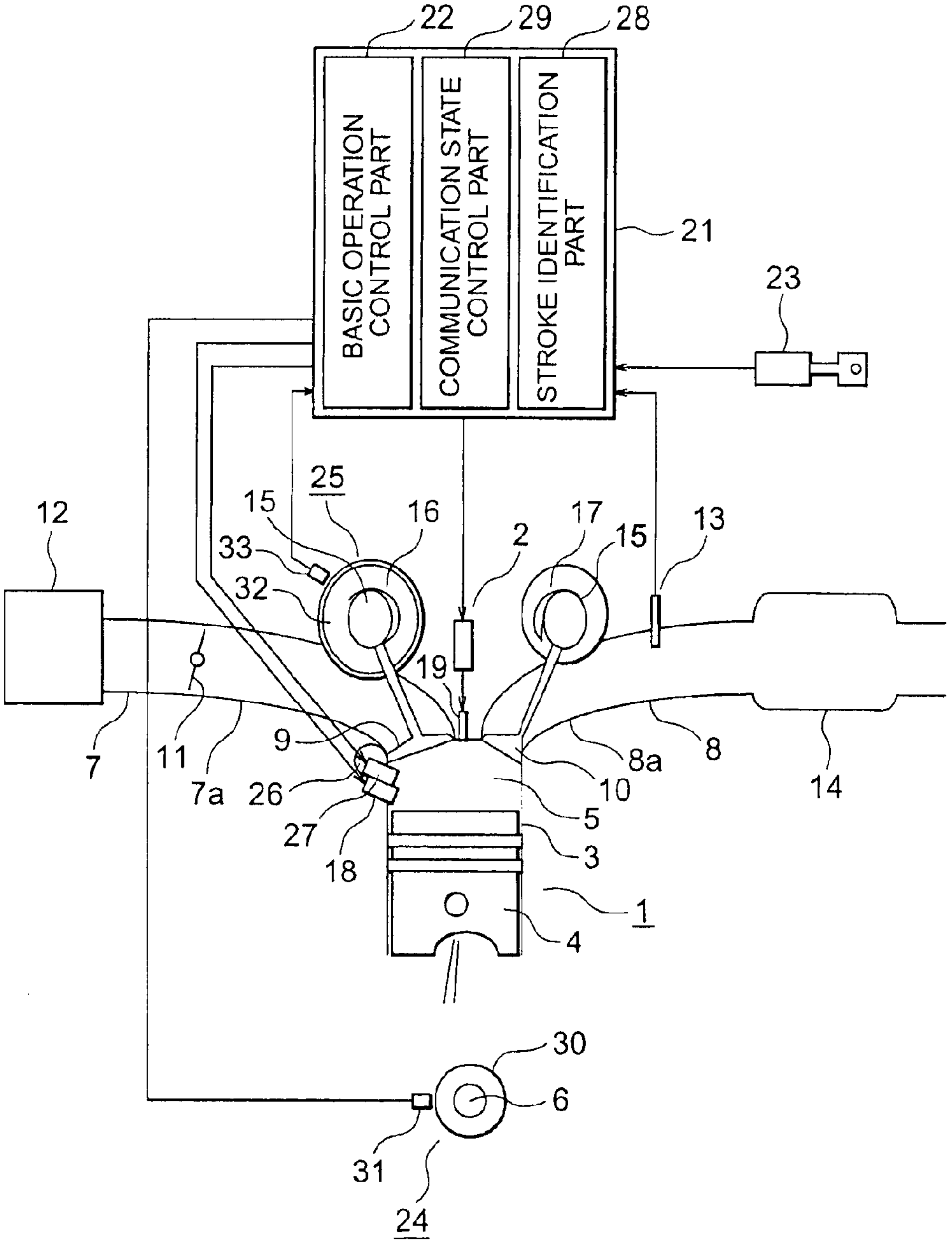
FIG. 1 is a block diagram of a four-cylinder internal combustion engine provided with a starting device according to a first embodiment of the present invention.
Figure 2:
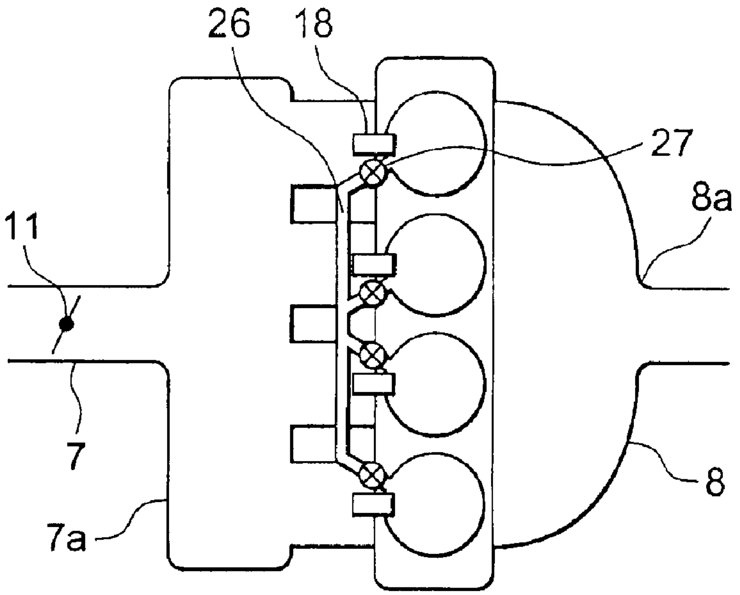
FIG. 2 is a layout view showing piping connecting between respective cylinders of FIG. 1 and valves for controlling the states of communication between the respective cylinders through the piping.
Figure 3:
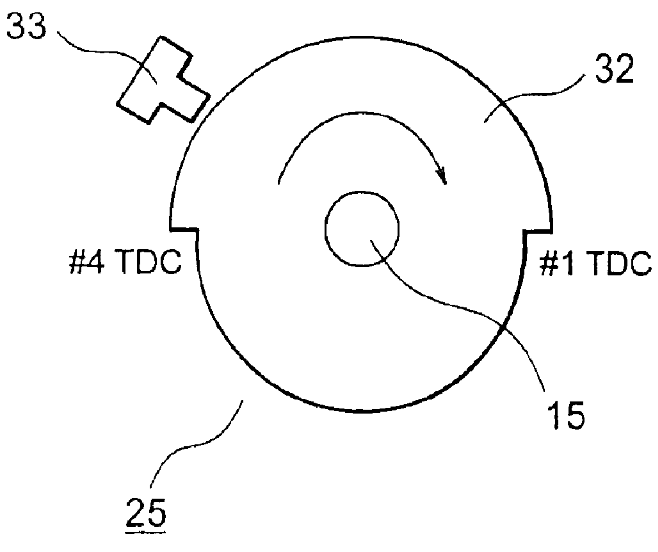
FIG. 3 is a side elevation of a compression/expansion identification part mounted on a camshaft of FIG. 1.
Figure 4:
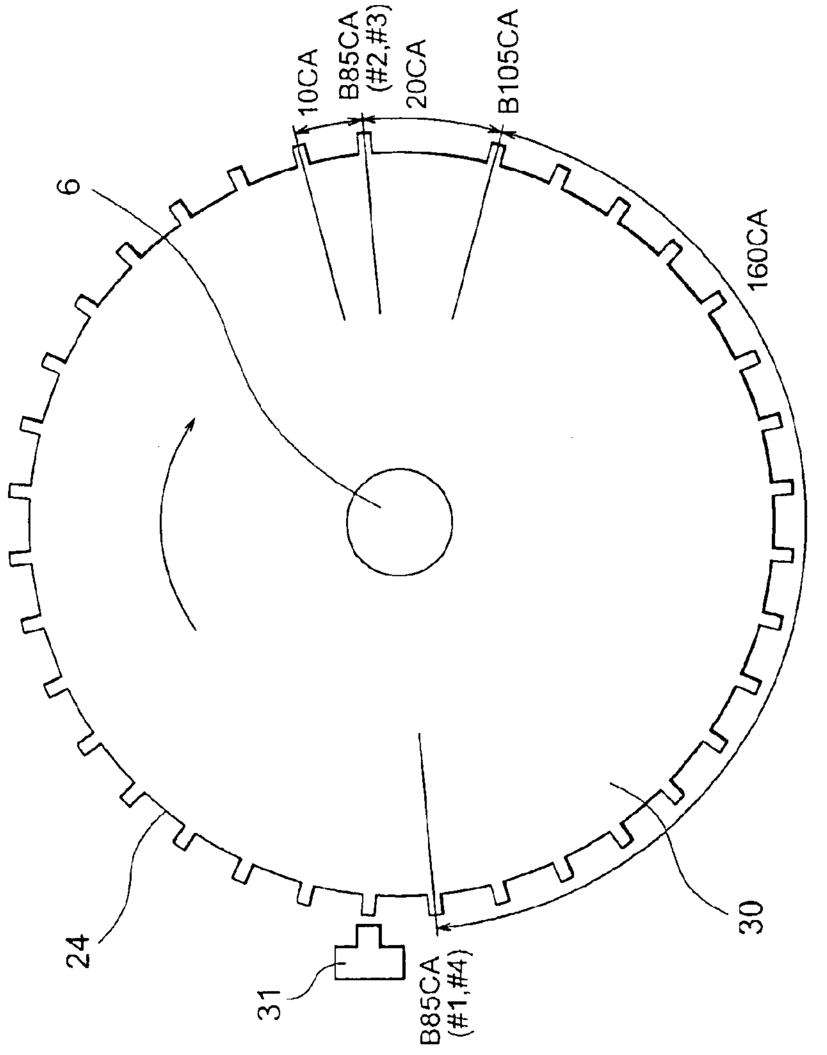
FIG. 4 is a side elevation of a crank angle detector mounted on a crankshaft of FIG. 1.
Figure 6:
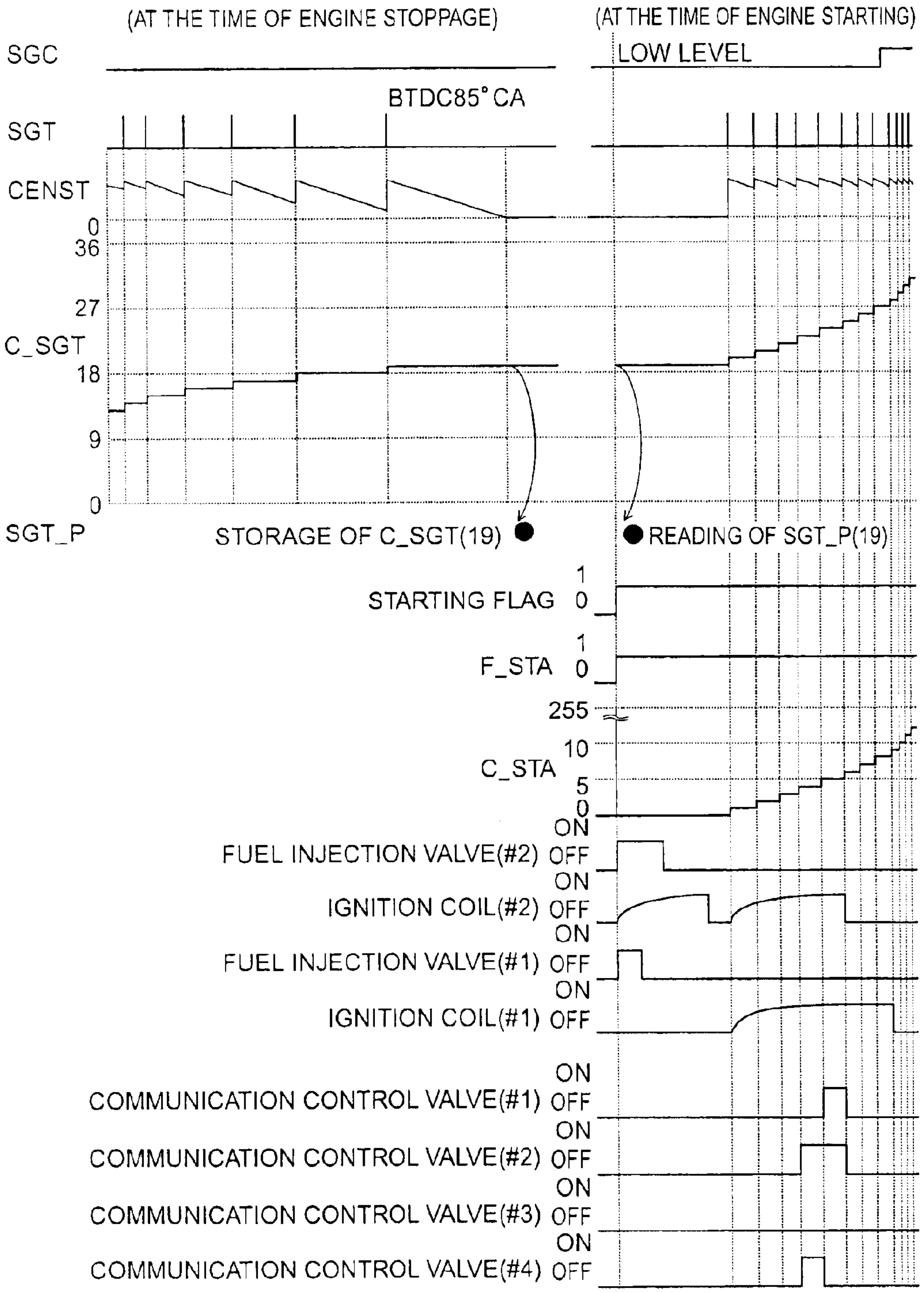
FIG. 6 is a relational view showing the relation between the respective strokes of the cylinders shown in FIG. 1, a crank angle signal and a cylinder identification signal.
Figure 7:
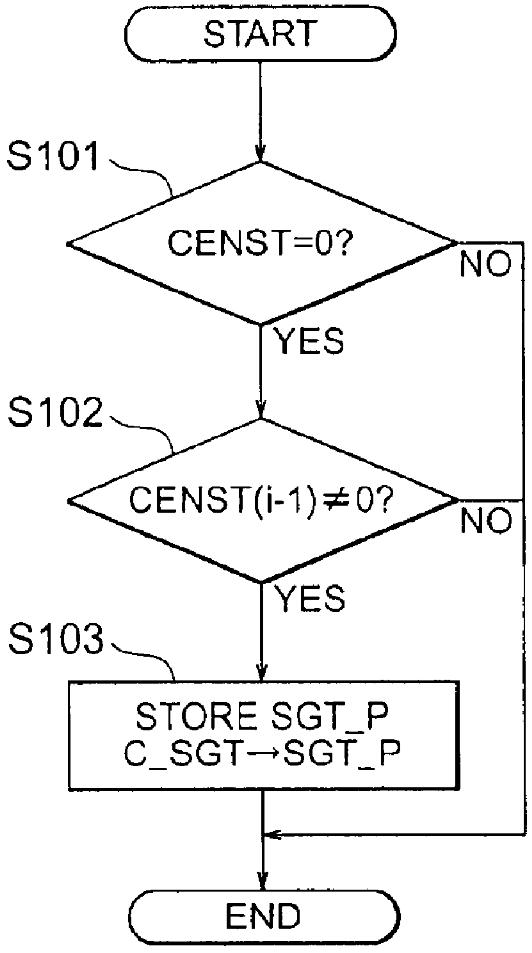
FIG. 7 is a flow chart showing the operational processing of the starting device executed by an electronic engine control unit of FIG. 1 when the engine is stopped.
Figure 8:
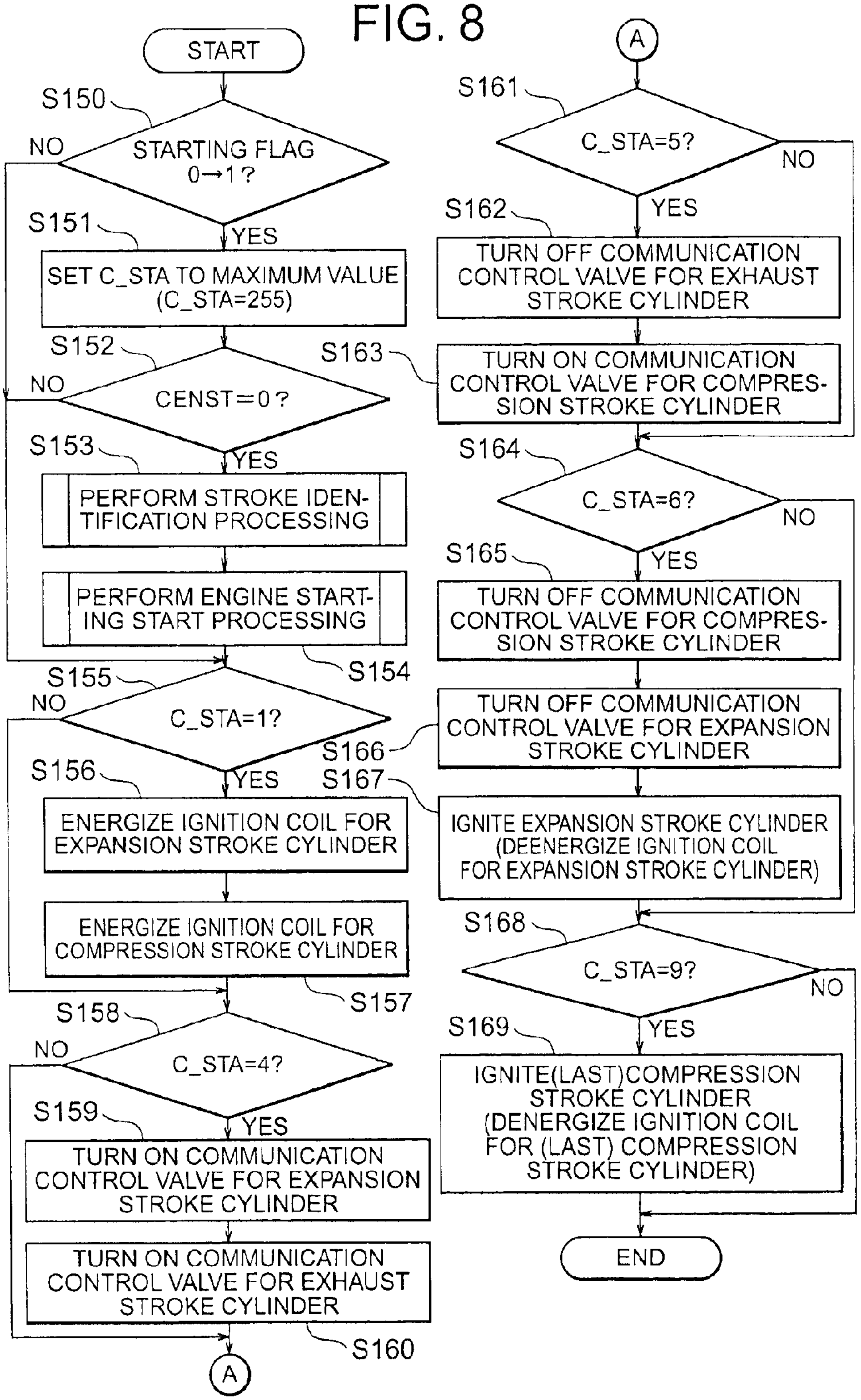
FIG. 8 is a flow chart showing the operational processing of the starting device executed by the electronic engine control unit of FIG. 1 when the engine is started.
Figure 9:
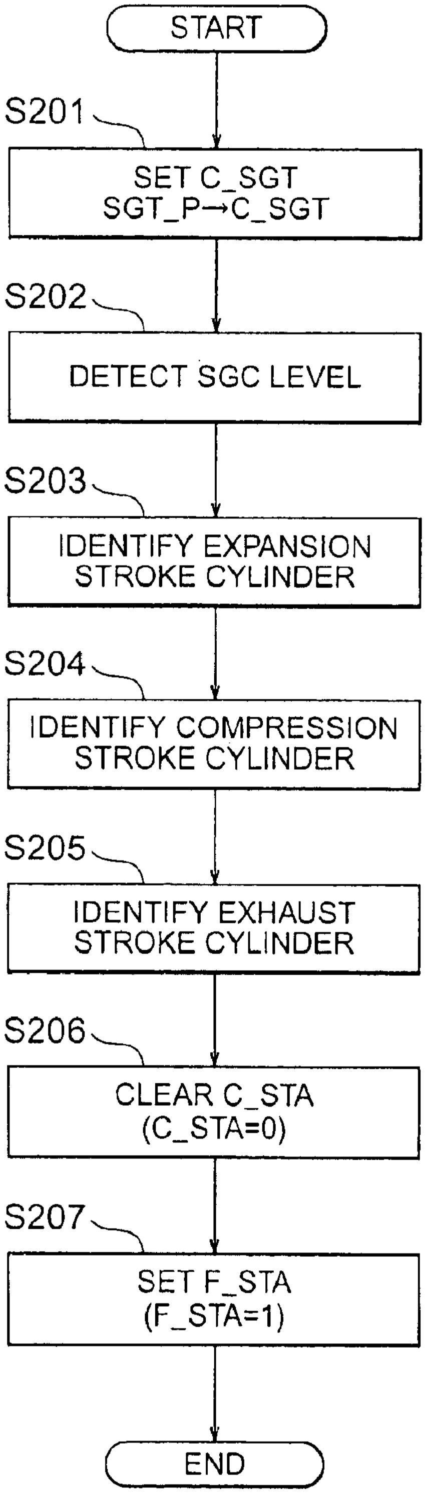
FIG. 9 is a flow chart showing the stroke identification processing of FIG. 8.
Figure 10:
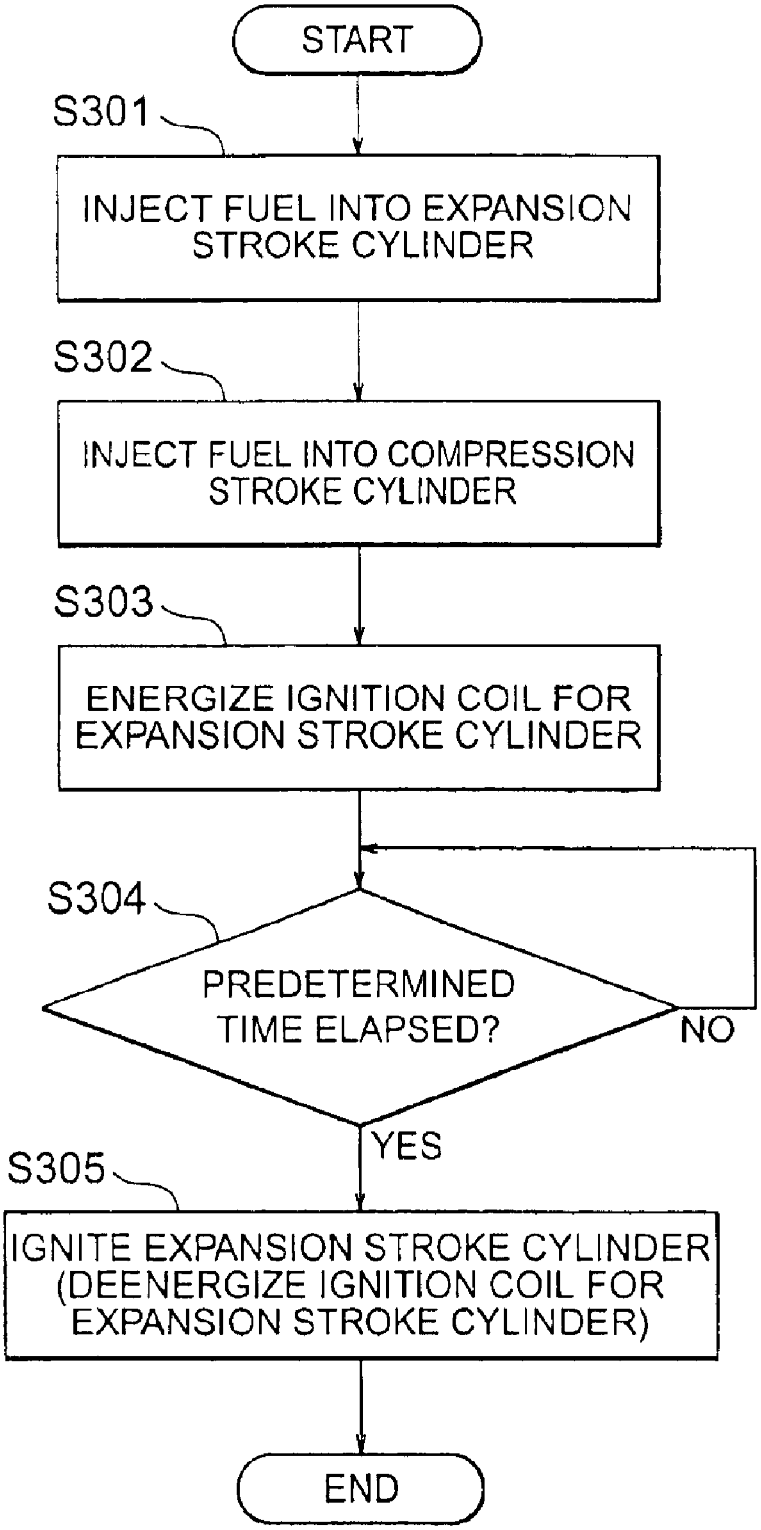
FIG. 10 is a flow chart showing the engine starting start processing of FIG. 8.

FIG. 1 is a block diagram of a four-cylinder internal combustion engine that is provided with a starting device constructed in accordance with a first embodiment of the present invention. FIG. 2 is a layout view that shows piping connecting between respective cylinders of FIG. 1 and valves (hereinafter referred to as communication control valves) for controlling the states of communication between the respective cylinders through the piping. FIG. 3 is a side elevation of a compression/expansion identification part mounted on a camshaft. FIG. 4 is a side elevation of a crank angle detector mounted on the crankshaft of the internal combustion engine. FIG. 5 is a table that shows the behaviors of respective parameters of the starting device when the engine is stopped and started, respectively. FIG. 6 shows the relation between the strokes of cylinders, a crank angle signal and a cylinder identification signal. FIG. 7 is a flow chart that shows the operational processing of the starting device executed by an electronic engine control unit when the engine is stopped. FIG. 8 is a flow chart that shows the operational processing of the starting device executed by the electronic engine control unit when the engine is started. FIG. 9 is a flow chart that shows the stroke identification processing of FIG. 8. FIG. 10 is a flow chart that shows the engine starting start processing of FIG. 8.

First of all, reference will be made to the four-cylinder internal combustion engine. The internal combustion engine is a direct injection spark ignition internal combustion engine that is provided with four cylinders 1, which are fired in a firing order of a first cylinder (hereinafter referred to as cylinder #1)—a third cylinder (hereinafter referred to as cylinder #3)—a fourth cylinder (hereinafter referred to as cylinder #4)—a second cylinder (hereinafter referred to as cylinder #2). The four-cylinder internal combustion engine includes four pistons 4 (though only one is illustrated in FIG. 1) each of which reciprocates in a vertical direction in a corresponding cylinder 1 together with a piston ring 2 fitted in the outer periphery thereof along an inner wall 3 of the corresponding cylinder 1, a combustion chamber 5 defined in each cylinder 1 by the piston 4 and the cylinder wall 3, and a crankshaft 6 connected with the respective pistons 4 through respective piston rods. The reciprocating motion of each piston 4 that moves in the vertical direction in a corresponding cylinder 1 is transmitted to the crankshaft 6 through the respective piston rods, whereby the crankshaft 6 is caused to rotate.

In addition, the internal combustion engine further includes an intake pipe 7 and an exhaust pipe 8 which are in communication with the combustion chambers 5 defined in the respective cylinders 1 through an intake manifold 7*a* and an exhaust manifold 8*a*, respectively, intake valves 9 and exhaust valves 10 (though only one is illustrated) for opening and closing communications between the respective combustion chambers 5 and the intake manifold 7*a* and between the respective combustion chambers 5 and the exhaust manifold 8*a*, a throttle valve 11 that is arranged in the intake pipe 7 for controlling combustible air that enters the combustion chambers 5, an air cleaner 12 connected with the intake pipe 7 for cleaning the air sucked into the combustion chambers 5, an oxygen sensor 13 arranged in such a manner as to protrude into the exhaust pipe 8, and a muffler 14 connected with the exhaust pipe 8 for reducing or muffling the exhaust sound or noise of the exhaust gas discharged from the exhaust pipe 8.

A pair of camshafts 15 for driving the intake valves 9 and the exhaust valves 10 are operatively connected with the crankshaft 6 through the intermediary of mechanical transmission means (not shown) such as timing belts in a manner such that the camshafts 15 are caused to make one revolution during two revolutions of the crankshaft 6. The camshafts 15 for driving the intake valves 9 and the exhaust valves 10 are respectively provided with a cam 16 and a cam 17 for opening and closing the intake valves 9 and the exhaust valves 10, respectively.

The internal combustion engine further includes fuel injection valves 18 arranged on the respective cylinders 1 for directly injecting fuel into the combustion chambers 5 of the corresponding cylinders 1, respectively, spark plugs 19 installed on the upper portions of the corresponding cylinders 1, respectively, ignition coils 20 for applying a high voltage to the corresponding spark plugs 19, respectively, and an electronic engine control unit 21 for controlling various aspects of the internal combustion engine. The electronic engine control unit 21 includes a basic operation control part 22 for controlling the fuel injection valves 18, the spark plugs 19 and the ignition coils 20. Thus, the amounts of fuel injected from the fuel injection valves 18, the fuel injection timing, and the ignition timing of the spark plugs 19 are controlled by the electronic engine control unit 21. An ignition key or switch 23 is adapted to be turned on by an operator or driver to generate an ignition signal to the electronic engine control unit 21, so that fuel is injected from one of the fuel injection valves 18 directly to the combustion chamber 5 of a corresponding cylinder 1 at an amount proportional to the signal received from the electronic engine control unit 21. When entering the combustion chamber 5, the fuel therein is fired or ignited by a corresponding spark plug 19. The electronic engine control unit 21 comprises a general or common microcomputer.

The starting device for an internal combustion engine according to the present invention includes a crank angle detector 24, a compression/expansion identification part 25, the fuel injection valves 18 installed on the respective cylinders 1 so as to directly inject fuel into the combustion chambers 5, respectively, the spark plugs 19 mounted on the upper portions of the cylinders 1, respectively, the ignition coils 20 for applying a high voltage to the spark plugs 19, the electronic engine control unit 21 for controlling the starting device, piping 26 for connecting between the respective cylinders 1, and valves 27 (hereinafter referred to as communication control valves) for controlling the states of communication between the respective cylinders through the piping 26. Here, note that the crank angle detector 24, the fuel injection valves 18, the spark plugs 19 and the ignition coils 20 are commonly used or shared by the starting device as well as by the ordinary internal combustion engine. The electronic engine control unit 21 includes a stroke identification part 28, a communication state control part 29 that controls the communication control valves 27, and a basic operation control part 22, all of which will be described later in detail. The electronic engine control unit 21 is composed of the microcomputer that constitutes the electronic engine control unit 21.

The crank angle detector 24 is provided with a signal disk 30 mounted on the crankshaft 6 and a sensor 31. The signal disk 30 is provided with a multitude of protrusions at intervals of 10° crank angle (hereinafter abbreviated as CA). Among these protrusions, a protrusion corresponding to a crank angle of 95° CA before compression top dead center (hereinafter referred to as B95° CA) in cylinders #2 and #3 is lost or missing to provide a missing tooth. The sensor 31 is arranged in opposition to the outer peripheral surface of the signal disk 30 apart a prescribed distance therefrom. The gap or distance between the sensor 31 and the signal disk 30 changes in accordance with the rotation of the signal disk 30, whereby the sensor 31 generates a pulse-shaped crank angle position signal (hereinafter referred to as SGT). Owing to the provision of the missing tooth, the period of the SGT generated when the sensor 31 passes the missing tooth becomes longer than others. For instance, by comparing the ratio $t(i)/t(i-1)$ of the current SGT period $t(i)$ to the last SGT period $t(i-1)$ with a predetermined threshold value k, the untoothed position (i.e., the position of the missing tooth) is detected, whereby the position of B85° CA can be specified. Here, note that the value of k may be 1.5 for instance.

The compression/expansion identification part 25 is provided with a signal disk 32 mounted on a camshaft (e.g., an intake-side camshaft) 15 and a sensor 33. The signal disk 32 has two different radii in such a manner that a radius in a range of from the compression top dead center of cylinder #1 to the compression top dead center of cylinder #4 is greater than a radius in a range of from the compression top dead center of cylinder #4 to the compression top dead center of cylinder #1. In addition, the sensor 33 is arranged in opposition to the outer peripheral surface of the signal disk 32 apart a prescribed distance therefrom. The sensor 33 detects the size or length of a gap or distance between the sensor 33 and the signal disk 32 in accordance with the rotation of the corresponding camshaft 15, and generates a compression/expansion identification signal (hereinafter referred to as SGC) comprising two values, i.e., a high value and a low value. Here, note that the SGC becomes high in the range of from the compression top dead center of cylinder #1 to the compression top dead center of cylinder #4. Even in the stopped state of the internal combustion engine, the size or length of the gap between the sensor 33 and the signal disk 32 can be detected.

The operation of each cylinder includes four strokes comprising a compression stroke, an expansion stroke, an exhaust stroke and an intake stroke. These cylinder strokes can be identified by using a combination of the values of the SGT and the SGC, as shown in FIG. 5. For instance, when the level of the SGC is high with the SGT being at a crankshaft position of B85° CA, it can be specified that cylinder #1 is on the expansion stroke, cylinder #2 is on the exhaust stroke, cylinder #3 is on the compression stroke, and cylinder #4 is on the intake stroke.

Now, reference will be made to parameters used upon stoppage and starting of the internal combustion engine. The axis of abscissa in FIG. 6 represent the time elapsed, but a description is omitted about the behavior, during stoppage of the internal combustion engine, of part of parameters such as those for the fuel injection valves and the like, which are turned off when the engine is stopped.

A parameter "SGC" is the compression/expansion identification signal SGC as previously explained, and its level changes between a high level and a low level in accordance with the rotation of the camshaft 15. Also, a parameter "SGT" is the crank angle position signal SGT as previously explained and it is generated in accordance with the rotation of the crankshaft 6 and hence the rotation of the internal combustion engine.

A parameter "censt" is a counter for determining whether the engine is stopped or not, and it is set to a predetermined value (150) each time the crank angle position signal SGT is input to the electronic engine control unit 21, and it is counted down or decremented by "1" in accordance with the elapse of 1 msec. When there is no input of the SGT for a prescribed period of time, the value of the "censt" becomes zero, at which time, it is determined that the engine is stopped.

A parameter "C_SGT" is a counter for identifying the crankshaft position (angle), and it is counted up at each SGT input and reset to "1" at a crank angle of B85° CA at which the missing teeth is detected. The crankshaft position is obtained by using this counted up value.

A parameter "SGT_P" is a memory in which the crankshaft position upon stoppage of the engine is stored. Also, the content of the counter "C_SGT" is transmitted to and stored in the memory "SGT_P".

Next, reference will be made to parameters used at the time of engine starting. When the ignition switch 23 is operated by the driver or when a request for starting the engine is made by an instruction of the electronic engine control unit 21, an engine starting flag is changed from "0" to "1".

A parameter "F_STA" is a flag used for determining whether the starting of the engine has been carried out without the use of the starter motor (hereinafter referred to as "engine starting without using the starter motor"), and it is set to "1" when the engine starting without using the starter motor is carried out.

A parameter "C_STA" is a flag for obtaining the number of SGT detections (i.e., the rotational position of the crankshaft) after engine starting, and it is reset to "0" when a signal is input from the ignition switch 23 to the electronic engine control unit 21, and thereafter counted up at each SGT input.

Finally, the statuses of the fuel injection valves, the ignition coils and the communication control valves for the respective cylinders are illustrated in FIG. 6 though an explanation thereof is omitted.

Now, the operation of the first embodiment of the present invention will be described while referring to flow charts of FIGS. 7 through 11.

First, the processing performed when the engine is stopped will be described. In step S101, in order to make a determination as to whether the engine is in a stopped state, it is determined whether the "censt" is equal to "0". Each time an SGT is input to the electronic engine control unit 21, the "censt" is reset to the predetermined value of 150, and it is thereafter decremented by "1" every 1 msec until the following SGT is input. When the rotational speed of the engine becomes equal to or less than about 10 r/min (or about 20 r/min at the location of the missing tooth), the interval or period at which the crank angle signal SGT is generated becomes equal to or more than 160 msec, and the "censt" is subtracted or decremented to "0". At this time, it is determined that the engine is in the stopped state.

When the engine is determined to be in the stopped state, it is further determined in step S102 whether the determination of the engine stoppage state has been made for the first time (i.e., the last "censt" ≠0). As a result, when it is determined that the determination of the engine stopped state has been made for the first time, a value of 19 of the "C_SGT" is stored in the "SGT_P", and the processing at the time of engine stoppage is ended in order to store the crankshaft position when the engine is stopped.

The processing upon engine starting will now be described below. In step S150, it is detected whether the engine starting flag has changed from "0" to "1". When there is no change in the engine starting flag, the control flow advances to step S155, whereas when a change in the engine starting flag has been detected, the control flow advances to step S151.

In step S151, in order to permit the engine starting processing without using the starter motor to be cancelled at the time of occurrence of a special state to be described later, a value of 255 is set in the "C_STA" and the control flow advances to step S152. In step S152, in order to make a determination as to whether the engine is in a stopped state, it is determined whether the "censt" is equal to "0". When it is detected that the engine is in a stopped state, the control flow advances to step S153 whereas when it is detected that the engine is rotating, the control flow advances to step S155. In step S153, the stroke identification processing (see FIG. 9) is carried out, and then in step S154, the engine stating start processing (see FIG. 10) is carried out.

In the stroke identification processing of step S153, as shown in step S201 in FIG. 9, the engine stoppage crankshaft position of 19, which was stored in the "SGT_P" upon stoppage of the engine, is read in by the stroke identification part 28, and is set in the "C_SGT". In step S202, an SGC is detected, and an SGC of a low level is obtained. The stroke identification part 28 identifies, based on information on the crankshaft position and the SGC, whether each cylinder is on the expansion stroke, the compression stroke or the exhaust stroke. As a result, it is possible to identify that the cylinder on the expansion stroke is cylinder #2, the cylinder on the compression stroke is cylinder #1, and the cylinder on the exhaust stroke is cylinder #4. In step S206, the "C_STA" is cleared to "0". In step S207, the "F_STA" is set to "1" and the stroke identification processing is completed.

Since the "C_STA" previously set to a maximum value of 255 in step S151 is cleared to "0" in step S206, and the "F_STA" is set to "1" in step S207, it is understood that the engine starting without using the starter motor has been executed by determining the values of the "C_STA" and the "F_STA".

In the engine starting start processing of step S154, as shown in FIG. 10, a fuel injection valve 18 for cylinder #2 is driven to inject fuel into the combustion chamber 5 of the cylinder #2 on the expansion stroke for a predetermined period of time in step S301. Then in step S302, a fuel injection valve 18 for cylinder #1 is driven to inject fuel to the combustion chamber 5 of the cylinder #1 on the compression stroke for a predetermined period of time. Here, note that the amount of air in the combustion chamber 5 of each cylinder is obtained from the "C_SGT", and the amount of fuel to be injected is determined such that the air fuel ratio of the mixture in the combustion chamber 5 of each cylinder becomes 14.7 or slightly richer than this value for example.

In step S303, the energization of an ignition coil 20 for cylinder #2 on the expansion stroke is started. In step S304, it is determined whether a predetermined time has elapsed from the start of the energization, and in step S305, a spark plug 19 for cylinder #2 on the expansion stroke is caused to generate a spark, whereby the mixture in the combustion chamber 5 of the cylinder #2 is fired, thus completing the engine starting start processing. Here, note that the predetermined time for energization is the period of time required for the ignition of the mixture as well as for the evaporation of the fuel in the combustion chamber 5 of each cylinder 5.

As the cylinder #2 on the expansion stroke is fired to combust the fuel therein, the engine is started to rotate, as a result of which the SGT is detected and the "C_SGT" and "C_STA" are counted up. In case where combustion does not take place for some reasons, no SGT is detected and the "C_STA" remains zero after the lapse of the predetermined time, and hence it is necessary to perform the engine starting operation by means of the starter motor, as in the case of the prior art.

On the other hand, when the engine is rotating, the engine starting without using the starter motor is not carried out as a special case. Though not described in this embodiment, it is preferable in this case that the engine is started, for instance, by the use of the starter motor, as in the prior art. Even in such a case, the value of 255 is set in the "C_STA" in step S151, and hence the processing of the engine starting without using the starter motor is not performed after step S155.

In step S155, by determining whether the "COSTA" is equal to "1", a first SGT after the engine has started rotating is detected. When the "C_STA" is equal to "1", the control flow advances to step S156 whereas when otherwise, the control flow advances to step S158. Since the engine has already started rotating due to the first combustion, in step S156, an ignition coil 20 for cylinder #2 on the expansion stroke is energized to cause combustion of the air fuel mixture therein for the second time. In step S157, an ignition coil 20 for cylinder #1 on the compression stroke is energized for the combustion of the air fuel mixture therein on the following stroke.

In this connection, other than the case where the number of SGT detections after the engine starting exceeds "1", there is also considered another case where the engine has not yet started rotating or where the engine has already been started to rotate according to a method other than the engine starting method of the present embodiment (e.g., the engine is started by means of the starter motor).

Subsequently, in step S158, it is detected when the "C_STA" becomes equal to "4". When it is detected that the "C_STA" is equal to "4", the control flow advances to step S159 whereas when otherwise, the control flow advances to step S160. In step S159, a communication control valve 27 for cylinder #2 on the expansion stroke is opened by means of the communication state control part 29. In step S160, a communication control valve 27 for cylinder #4 on the exhaust stroke is opened by means of the communication state control part 29, whereby the cylinder #2 on the expansion stroke and the cylinder #4 on the exhaust stroke are placed into communication with each other, thereby causing the combustion gas in the cylinder #2 on the expansion stroke to be exhausted into the cylinder #4 on the exhaust stroke.

Since the combustion gas in the cylinder #2 on the expansion stroke is exhausted, there disappears the force for rotating the engine, but the engine keeps rotating due to the rotational force or torque accumulated in an unillustrated flywheel. In addition, since the pressure in the cylinder #2 on the expansion stroke is reduced, it becomes possible to introduce an air fuel mixture supplied from a later-mentioned cylinder on the compression stroke into the cylinder #2.

Then, it is detected when the "C_STA" is equal to "5". When "C_STA"=5 is detected, the control flow advances to step S162 whereas when otherwise, the control flow advances to step S164. In step S162, a communication control valve 27 for cylinder #4 on the exhaust stroke is closed by means of the communication state control part 29. In step S163, a communication control valve 27 for cylinder #1 on the compression stroke is opened by means of the communication state control part 29, whereby the cylinder #1 on the expansion stroke is placed into communication with the cylinder #2 on the compression stroke, thereby permitting the air fuel mixture compressed in the cylinder #1 on the compression stroke to flow into the cylinder #2 on the expansion stroke. As a result, the compression resistance of the cylinder #1 on the compression stroke disappears, and fresh air is supplied to the cylinder #2 on the expansion stroke, thus making it possible for second combustion to take place.

Subsequently, in step S164, it is detected when the "COSTA" is equal to "6". When "C_STA"=6 is detected, the control flow advances to step S165 whereas when otherwise, the control flow advances to step S168. In step S165, a communication control valve 27 for cylinder #1 on the compression stroke is closed by means of the communication state control part 29. In step S166, a communication control valve 27 for cylinder #2 on the expansion stroke is closed by means of the communication state control part 29, thereby ending the communication between the cylinder #1 on the compression stroke and the cylinder #2 on the expansion stroke. In step S167, the cylinder #2 on the expansion stroke is fired again, as a result of which there is again generated a force for rotating the engine due to the combustion in the cylinder #2 on the expansion stroke, thus making it possible to start the engine.

In step S169, it is determined whether the "C_STA" is equal to "9". When "C_STA"=9 is detected, the control flow advances to step S169 whereas when otherwise, the current processing is ended. In step S169. the cylinder #1 on the last compression stroke is fired. This compression stroke cylinder #1 is already operated on the expansion stroke due to the rotation of the engine while passing compression top dead center, and part of an air fuel mixture being supplied thereto on the expansion stroke is compressed to a more or less extent and hence is able to generate torque for continuously rotating the engine, thus making it possible to start the engine.

Such a starting device for an internal combustion engine is able to reduce the compression force of the compression stroke cylinder, and at the same to supply the compressed air in the compression stroke cylinder to the expansion stroke cylinder, whereby the starting torque can be increased due to the compressed air, thus making it possible to improve the startability of the engine.

In addition, the discharge of the combustion gas from the expansion stroke cylinder and the supply of air to the compression stroke cylinder serve to enable further combustion, so that the startability of the engine can be further improved.

Although in the first embodiment, individual control operations are carried out based on the value of the "C_STA", the respective threshold values for the "C_STA" may be changed in accordance with the SGT position "SGT_P" upon engine starting, the rotational speed of the engine, the temperature of engine water or coolant or the like.

Moreover, in case where the engine starting without using the starter motor can not be performed for some reasons, for example, where engine starting is not carried out after a predetermined time has elapsed from the time when the flag "F_STA" indicating that the engine starting without using the starter motor becomes "1", it is determined that the engine starting without using the starter motor has not been effected successfully for some causes, and the engine starting may be changed to one according to the starter motor as usual.

Further, although solenoid valves as used for fuel injection but made larger in size are employed as the communication control valves, they may have a configuration like the shape of an intake valve driven by an electromagnetic force.

Furthermore, in the engine starting start processing, the injection of fuel to the combustion chamber of the compression stroke cylinder may be performed after step S165 but before the energization of a corresponding ignition coil.

Still further, although the fuel injection to the compression stroke cylinder is executed in step S302 beforehand, it may be carried out at the end of the communication between the compression stroke cylinder and the expansion stroke cylinder after step S165 and step S166. In that case, it is needless to say that fuel injection to the expansion stroke cylinder is required in order to supply compressed air to the expansion stroke cylinder.

Embodiment 2.

Figure 11:
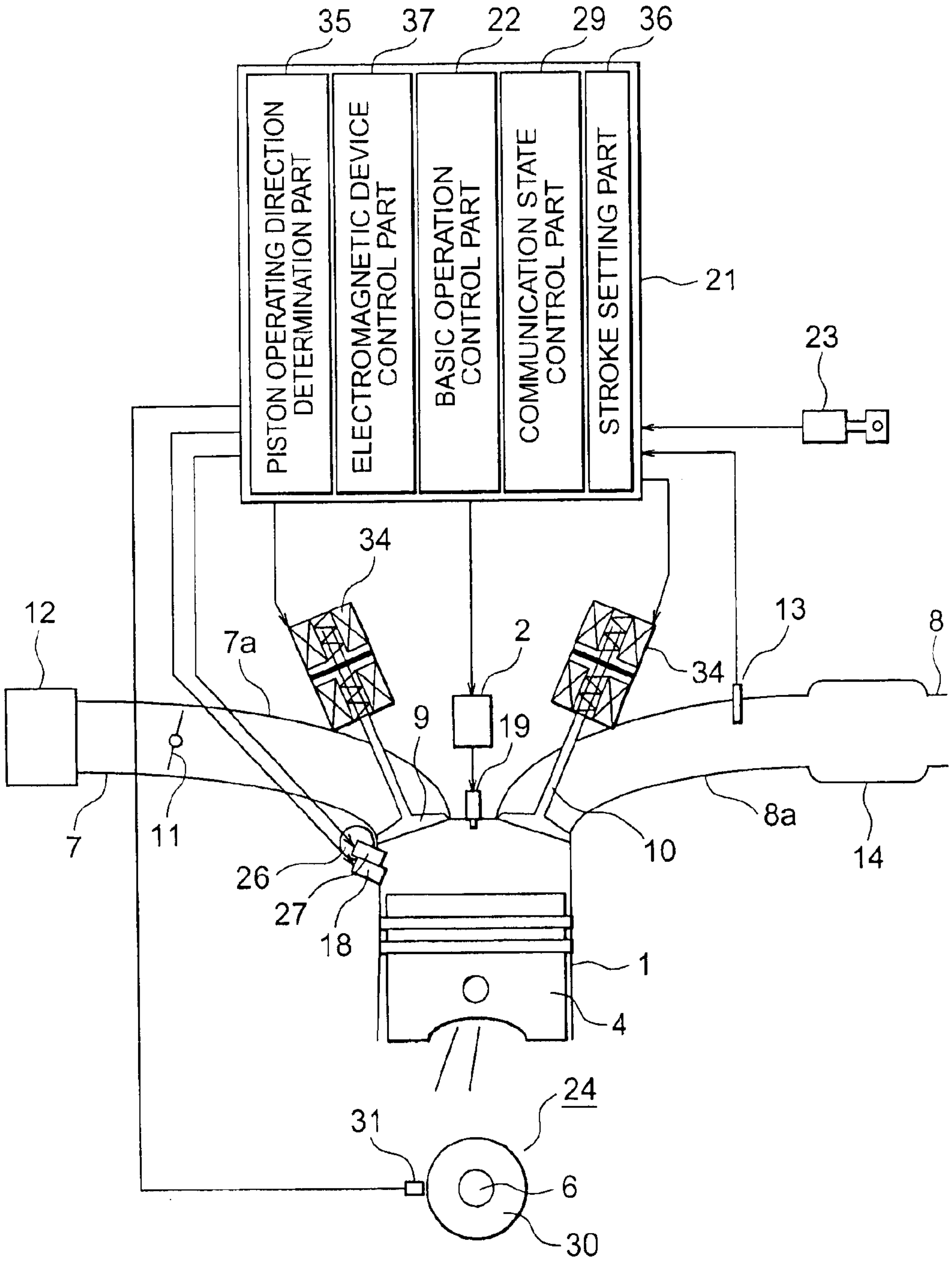
FIG. 11 is a block diagram of a four-cylinder internal combustion engine provided with a starting device according to a second embodiment of the present invention.
Figure 12:
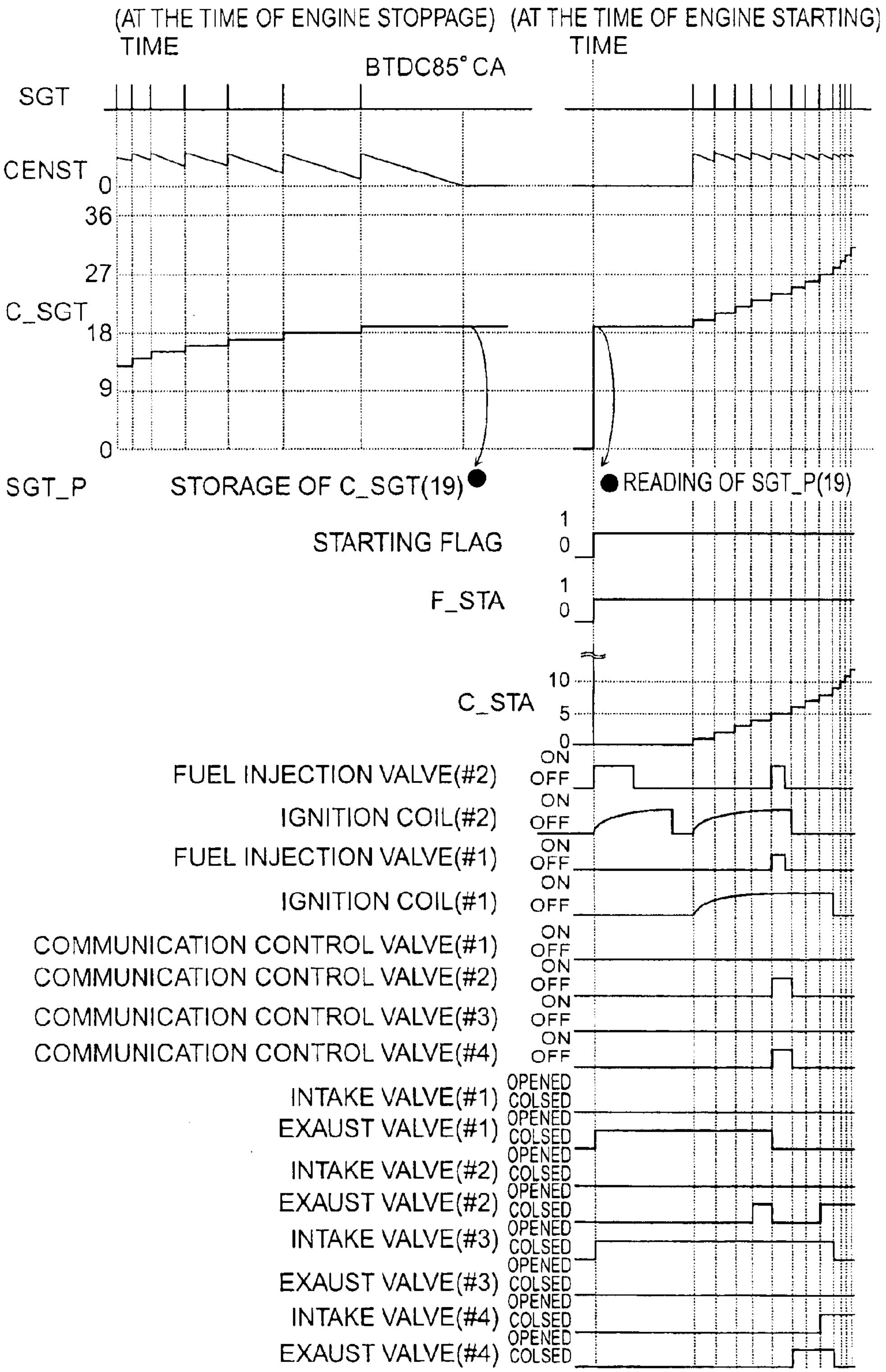
FIG. 12 is a table showing an example of the behaviors of respective parameters of the starting device of FIG. 11 when the engine is stopped and started, respectively.
Figure 13:
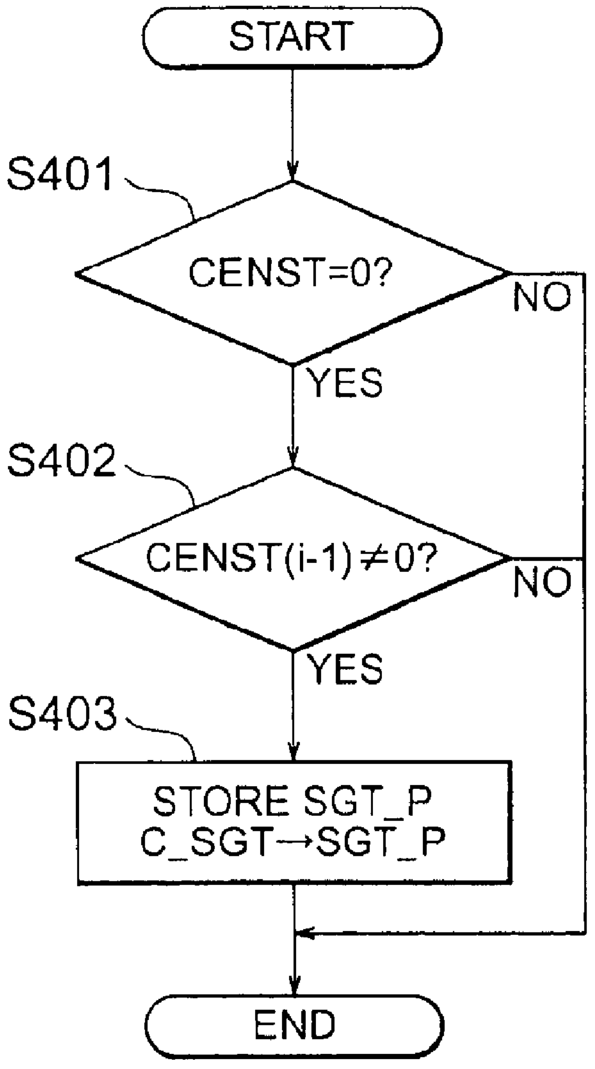
FIG. 13 is a flow chart showing the operational processing of the starting device executed by an electronic engine control unit of FIG. 11 when the engine is stopped.
Figure 14:
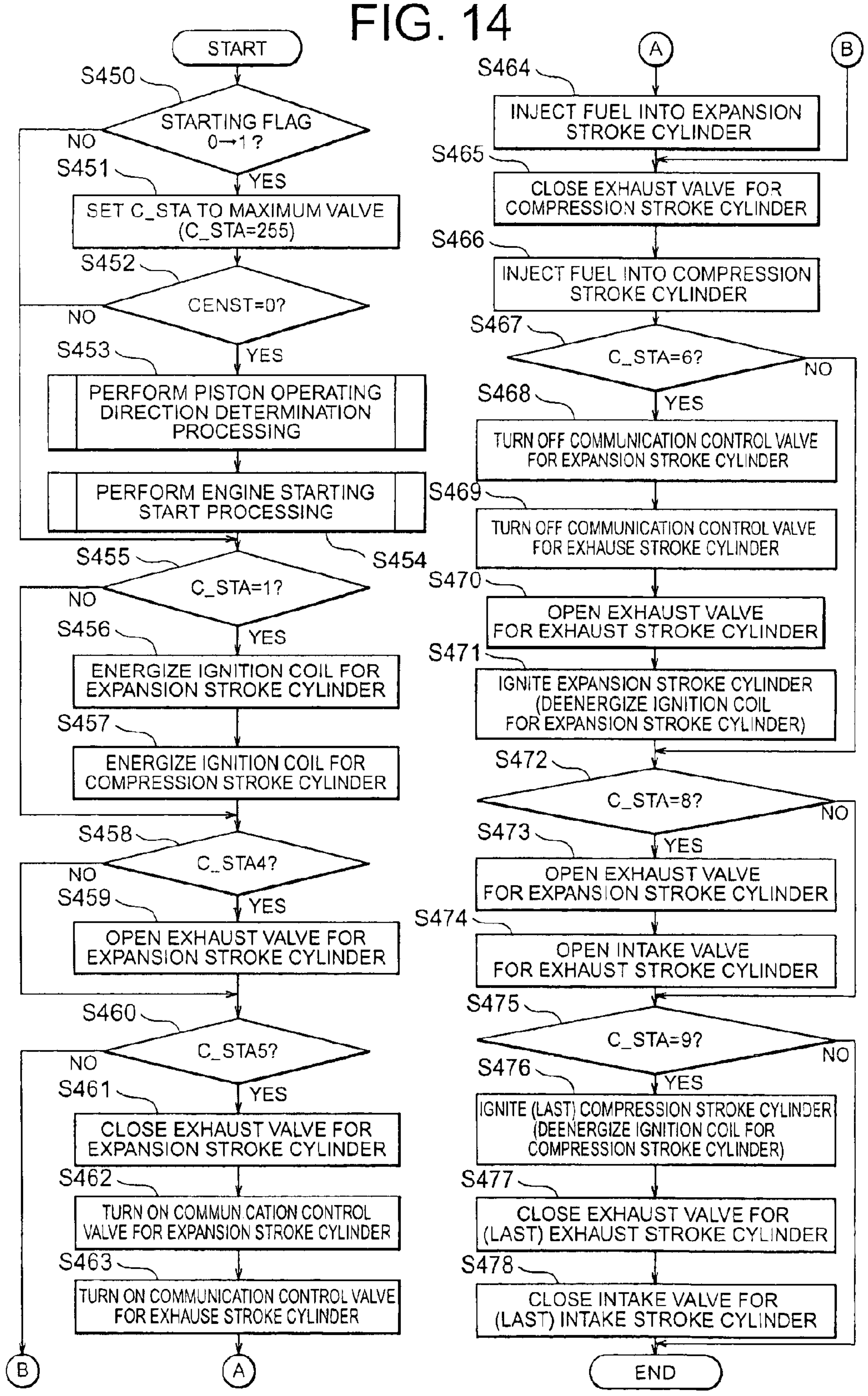
FIG. 14 is a flow chart showing the operational processing of the starting device executed by the electronic engine control unit of FIG. 11 when the engine is started.
Figure 15:
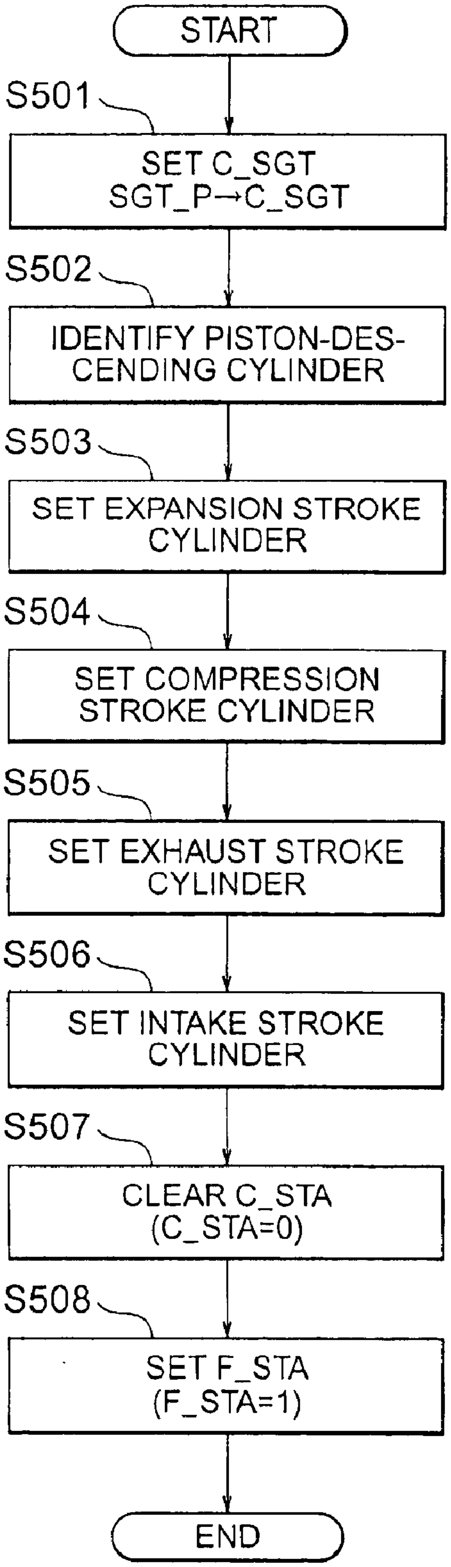
FIG. 15 is a flow chart showing the operating direction determination processing of FIG. 14.
Figure 16:
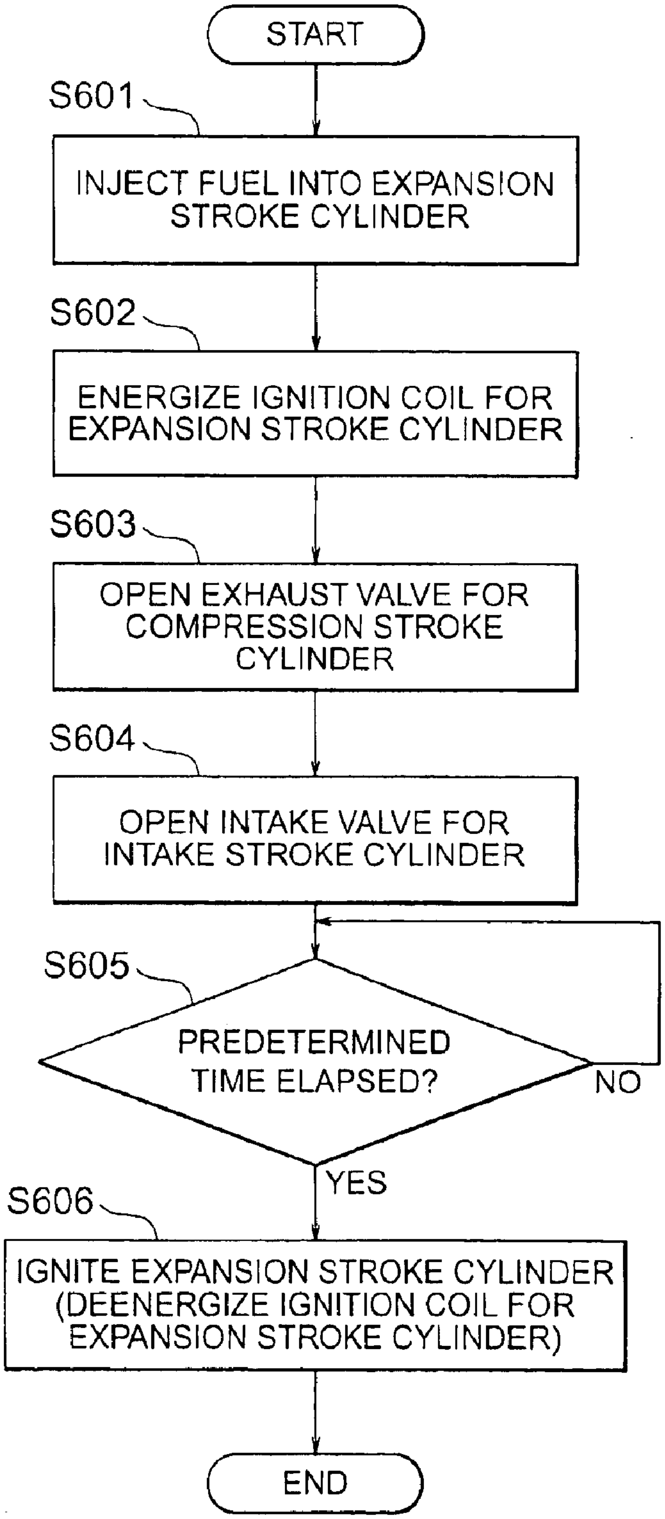
FIG. 16 is a flow chart showing the engine starting start processing of FIG. 14.

FIG. 11 is a block diagram of a four-cylinder internal combustion engine provided with a starting device according to a second embodiment of the present invention. FIG. 12 is a table that shows an example of the behaviors of respective parameters of the starting device of FIG. 11 when the engine is stopped and started, respectively. FIG. 13 is a flow chart that shows the operational processing of the starting device executed by an electronic engine control unit of FIG. 11 when the engine is stopped. FIG. 14 is a flow chart that shows the operational processing of the starting device executed by the electronic engine control unit of FIG. 11 when the engine is started. FIG. 15 is a flow chart that shows the operating direction determination processing of FIG. 14. FIG. 16 is a flow chart that shows the engine starting start processing of FIG. 14.

The starting device for an internal combustion engine according to this second embodiment is different from that of the above-mentioned first embodiment as shown in FIG. 1 in driving parts for driving exhaust valves and intake valves. The exhaust valves and the intake valves shown in FIG. 11 are opened and closed by means of the driving parts in the form of an intake valve electromagnetic driving device 34 and an exhaust valve electromagnetic driving device 34. Since the exhaust valves 9 and the intake valves 10 are controlled to open and close under the action of a magnetic force, unlike the case where such control is effected through camshafts 15 and the cams 16, 17 as shown in FIG. 1, the opening and closing timings of the intake valves 9 and the exhaust valves 10 are not fixed. Therefore, the operating direction of the piston in each cylinder is determined, and a desired one of two cylinders, which are determined to be operating in the same direction, is selected to be on the stroke concerned.

In addition, an electronic engine control unit 21 for a starting device is provided with a piston operating direction determination part 35, a stroke setting part 36, an electromagnetic device control part 37 and a communication state control part 29. The piston operating direction determination part 35 reads in a crank angle signal from a crank angle detector 24, and determines the operating direction (i.e., upward (ascending) direction or downward (descending) direction) of each piston 4. The stroke setting part 36 sets respective pairs of cylinders, which have been determined to be in the upward or ascending direction or in the downward or descending direction by the piston operating direction determination part 35, to four strokes, respectively. The electromagnetic device control part 37 controls the intake and exhaust valve electromagnetic driving devices 34. The concrete configuration of the signal disk 23, the position of a missing or lost tooth, a method of generating a crank angle position signal SGT and a method of detecting the untoothed or missing tooth position are the same as those in the above-mentioned first embodiment. In addition, piping 26 connecting between the respective cylinders and a communication control valve 27 are also the same as those in the first embodiment. Thus. an explanation of the same parts or portions is omitted.

The parameters shown in FIG. 12 are similar to those in the first embodiment except for those representing the states of the intake valves 9 and the exhaust valves 10 of the respective cylinders. In this embodiment, it is assumed that all of the intake valves 9 and the exhaust valves 10 are closed in the stopped state of the engine. In addition, part of parameters such as those for fuel injection valves and the like are turned off when the engine is stopped, and hence a description of their behaviors upon stoppage of the engine is omitted. Also, the intake valves 9 and the exhaust valves 10 are operated in the same timing as in the conventional engine when the engine is in a stopped state, and hence a description thereof is omitted.

Now, the operation of the second embodiment of the present invention will be described below in detail. Here, note that an operation for stopping the engine is shown in steps 401 through 403, which are similar to steps 101 through 103 of FIG. 7.

Explaining the processing upon engine starting, steps 450 through 452 are also similar to steps 150 through 152 of FIG. 7.

When the stoppage of the engine is detected in step S452, the piston operating direction determination processing is carried out in step S453 (see FIG. 15), and the engine starting start processing is then executed in step S454 (see FIG. 16).

On the other hand, when the engine is rotating, the engine starting without using the starter motor is not carried out as a special case, as in the aforementioned first embodiment.

In the piston operating direction determination processing of step S453, in step S501 of FIG. 15, the value of 19 stored in the "SGT_P" upon stoppage of the engine is read in so that the crankshaft position at that time is set in the "C_SGT". In step S502, it is identified which cylinders are in a piston descending process. Here, note that the cylinders with their pistons being descending are cylinders on the expansion stroke and on the intake stroke. Since the value of 19 is set in the "C_SGT" as shown in FIG. 5, the cylinders in which their pistons are descending can be identified as cylinder #2 and cylinder #3. In step S503, either cylinder #2 or cylinder #3 with its piston being descending is arbitrarily selected as a cylinder on the expansion stroke, and here, cylinder #2 is set as the expansion stroke cylinder. In step S504, cylinder #1 is set as a cylinder on the compression stroke, as shown in FIG. 5. In step S505, cylinder #4 is similarly set as a cylinder on the exhaust stroke (i.e., being supplied with compressed air). In step S506, cylinder #3 is similarly set as a cylinder on the intake stroke. Steps 507 and 508 are similar to steps 206 and 207, respectively, of FIG. 9. Thus, the "C_STA" is cleared to "0" and the "F_STA" is set to "1", thus completing the piston operating direction determination processing.

Returning to FIG. 13, in step S454, the engine starting processing is carried out so that an air fuel mixture is combusted for the first time.

In the engine starting start processing, in step S601 shown in FIG. 16, a fuel injection valve 18 for cylinder #2 is driven to inject fuel to the combustion chamber 5 of the cylinder #2 on the expansion stroke for a predetermined time. The amount of air in the cylinder #2 on the expansion stroke is calculated by the use of the value of "C_SGT", and the amount of fuel to be injected into the cylinder #2 is obtained from the amount of air thus calculated and a desired air fuel ratio of a mixture. The desired air fuel ratio may preferably be 14.7 or slightly richer than this value.

In step S602, the energization of an ignition coil 20 for the cylinder #2 is started. In step S603, the exhaust valve 10 of the compression stroke cylinder #1 is opened, thereby reducing the compression resistance of the compression stroke cylinder #1. In step S604, the intake valve 9 of cylinder #3 on the intake stroke is opened. In step S605, it is determined whether a predetermined time has elapsed after the start of the energization of an ignition coil 19 for cylinder #2. Here, note that the predetermined time for energization is the period of time required for the ignition of the mixture as well as for the evaporation of the fuel in the combustion chamber 5 of each cylinder 5. In step S606, the energization of the ignition coil 20 for cylinder #2 is turned off to ignite the air fuel mixture therein, thereby performing combustion thereof for the first time. In this manner, the engine starting start processing is ended.

When the cylinder #2 on the expansion stroke is ignited to combust the air fuel mixture therein, an SGT is detected so that both the "C_SGT" and the "C_STA" are counted up.

Turning to FIG. 14, in step S455, it is determined whether a first SGT after the rotation of the engine has been detected, and whether the "C_STA" is incremented by "1". When the "COSTA" is equal to "1", the control flow advances to step S456, where since the engine has already started rotating due to the first combustion, an ignition coil 20 for cylinder #2 on the expansion stroke is energized for preparation of the subsequent combustion.

In step S457, the energization of an ignition coil 20 for cylinder #1 on the compression stroke is started.

Then, in step S458, it is detected when the "C_STA" has been counted up to "4". When the value of "4" is detected in the "C_STA", the control flow proceeds to step S459, where the exhaust valve 10 of cylinder #2 on the expansion stroke is opened to discharge the exhaust gas generated by the first combustion.

In this embodiment, too, similar to the above-mentioned first embodiment, the pressure in the cylinder #2 on the expansion stroke is reduced so that an air fuel mixture supplied from a later-mentioned cylinder on the compression stroke can be introduced into the cylinder #2.

In step S460, it is detected when the "C_STA " has been counted up to "5". When the value of "5" is detected in the "C_STA", the control flow advances to step S461, where the exhaust valve 10 of cylinder #2 on the expansion stroke is closed. In step S462, a communication control valve 27 for cylinder #2 is opened. In step S463, a communication control valve 27 for cylinder #4 on the exhaust stroke is opened, thereby permitting the air fuel mixture compressed in the exhaust stroke cylinder #4 to flow into the cylinder #2 on the expansion stroke. In step S464, in order to supply fuel in accordance with the amount of air flowing into the cylinder #2, the fuel injection valve 18 of the cylinder #2 is driven for a predetermined time to inject fuel into the cylinder #2. As a result, the expansion stroke cylinder #2 is supplied with the compressed air from the cylinder #4 and the fuel injected from the corresponding fuel injection valve 18, whereby preparation for second combustion is made.

On the other hand, in step S465, the exhaust valve 10 of the compression stroke cylinder #1 is closed, and in step S466, a fuel injection valve 18 for cylinder #1 is driven to inject fuel to the combustion chamber 5 of the cylinder #1 on the compression stroke for a predetermined time. The amount of air in the compression stroke cylinder #1 is obtained from the "C_SGT", and the amount of fuel to be injected is obtained from the amount of air thus obtained and a desired air fuel ratio which is preferably 14.7 or slightly richer than this value.

Supplying the compressed air in the cylinder on the exhaust stroke to the cylinder on the expansion stroke can provide the degree of freedom to the timing at which the exhaust valve 10 of the compression stroke cylinder is closed. In this second embodiment, the timing at which the compressed air is supplied to the exhaust stroke cylinder and the timing at which the exhaust valve of the compression stroke cylinder is closed are made in agreement with each other, but when the amount of air in the compression stroke cylinder is increased for an increase in the combustion torque, it is also possible to close the exhaust valve of the compression stroke cylinder prior to the closure of the intake valve thereof.

In step S467, it is detected when the "C_STA" has been counted up to "6". When the value of "6" is detected in the C_STA, the control flow advances to step S468 where the communication control valve 27 of the expansion stroke cylinder #2 is closed. In step S469, the communication control valve 27 for the exhaust stroke cylinder #4 is closed, and in step S470, the exhaust valve 10 of the exhaust stroke cylinder #4 is opened. In step S471, the energization of the ignition coil 20 for the expansion stroke cylinder #2 is turned off to ignite the air fuel mixture in the cylinder #2, as a result of which there is again generated a force for rotating the engine due to the combustion in the expansion stroke cylinder #2, thus making it possible to start the engine.

In step S472, it is detected when the "C_STA" has been counted up to "8", and when the value of "8" is detected in the "C_STA", the control flow advances to step S473 where the exhaust valve 10 of the expansion stroke cylinder #2 is opened, and then in step S474, the intake valve 9 of the exhaust stroke cylinder #4 is opened. In accordance with these valve operations, the exhaust valve 10 of the expansion stroke cylinder #2 is opened, thereby shifting the cylinder #2 from the expansion stroke to the exhaust stroke as in the ordinary operating condition of the engine, and also the intake valve 9 of the exhaust stroke cylinder #4 is opened, thereby shifting the cylinder #4 from the exhaust stroke to the intake stroke.

In step S475, it is detected when the "C_STA " has been counted up to "9", and when the value of "9" is detected in the "C_STA", the control flow advances to step S476 where since the compression stroke cylinder #1 comes to a location near compression top dead center, the energization of the ignition coil 20 for cylinder #1 is turned off to ignite the air fuel mixture therein. This cylinder #1 has already passed compression top dead center and shifted to the expansion stroke due to the rotation of the engine. The exhaust valve for the cylinder #1 is opened to permit a part of intake air in the cylinder #1 to be exhausted therefrom, but the intake air in the cylinder #1 is compressed to a more or less extent, so that the torque for rotating the engine can be continuously generated, thus making it possible to start the engine. In step S477, the exhaust valve 10 of the cylinder #4, which has to now been on the exhaust stroke, is closed and in step S478 the intake valve 9 of cylinder #3, which has to now been on the intake stroke, is closed. In accordance with these valve operations, the exhaust stroke cylinder #4 shifts to the intake stroke, and the cylinder #3, which has to now been the intake stroke, shifts to the compression stroke as in the ordinary operating condition of the engine.

Thus, by performing the above processing, the starting of the engine is performed, and thereafter processing equivalent to the operations of the intake valves and the exhaust valves, injection and ignition processing in ordinary engines are carried out.

In such a starting device for an internal combustion engine according to this second embodiment, the intake valves 9 and the exhaust valves 10 are controlled to be opened and closed by means of the electromagnetic valves, and hence the opening and closing timings of the intake valves 9 and the exhaust valves 10 are not fixed. Therefore, the operating direction of the piston in each cylinder is determined, and a desired one of two cylinders, which are determined to be operating in the same direction, is selected to be on the stroke concerned, whereby the stroke of each cylinder can be determined from the crank angle position alone.

In addition, supplying the compressed air in the exhaust stroke cylinder to the expansion stroke cylinder can provide the degree of freedom to the timing at which the exhaust valve of the compression stroke cylinder is closed.

Moreover, the discharge of the combustion gas from the ignition cylinder and the air in the piston-ascending cylinder serve to enable further combustion, so that the startability of the engine can be further improved.

Further, a sufficient amount of intake air is supplied to the piston-ascending cylinder concerned, and the engine is driven to rotate by the combustion of another cylinder in which the piston therein is descending, so that a greater amount of torque can be generated by the combustion of the cylinder concerned when the cylinder concerned turns into the expansion stroke. As a consequence, the rotational speed of the engine can be increased further promptly.

Furthermore, since the cylinder concerned is not in communication with the other cylinders, a lot of compressed air exists in the cylinder concerned as compared with the case where it is in communication with another cylinder, and the engine is driven to rotate by the combustion of the piston-descending cylinder, so that a greater amount of torque will be able to be generated by the combustion of the cylinder concerned when the cylinder concerned turns into the expansion stroke.

Although in this second embodiment, individual control operations are carried out based on the value of "C_STA", the respective threshold values for the "C_STA" may be changed in accordance with the SGT position "SGT_P" upon engine starting, the rotational speed of the engine, the temperature of engine water or coolant or the like. In addition, similar to the above-mentioned first embodiment, in case where engine starting is not carried out after a predetermined time has elapsed from the time when the flag "F_STA" indicating that the engine starting without using the starter motor becomes "1", the engine can be started by using the starter motor, as in the prior art.

Although the above-mentioned first and second embodiments are configured such that the crank angle position signal is stored upon stoppage of the engine, a sensor may instead be used for detecting the crank angle position in the stopped state of the engine.

In addition, although the reference position of the crank angle position signal is obtained by using the missing tooth, the present invention is not limited to this but a separate signal may instead be provided. Also, the crank angle position signal SGT is generated at a crank angle of 10° CA, but it may instead be generated at arbitrary angular intervals such as, for instance, a crank angle of 5° CA.

Moreover, although the above explanations have been made about the four-cylinder internal combustion engine, the present invention can be applied to internal combustion engines with an arbitrary number of cylinders other than four cylinders.

Further, although engine starting without using a starter motor has been given as an example, it is possible to use a starter motor as a means for generating auxiliary power at the time of engine starting. In this case, if the above-mentioned embodiments are employed when the engine is started by the use of the starter motor, the following advantages will be attained. That is, it becomes possible to perform the engine starting with the starter motor of a size smaller than that of a conventional one which is solely used for engine starting. Besides, the consumption of electric power can be reduced and the durability of the starter motor can be improved.

While the invention has been described in terms of preferred embodiments, those skilled in the art will recognize that the invention can be practiced with modifications within the spirit and scope of the appended claims.

What is claimed is:

1. A starting device for an internal combustion engine which is provided with fuel injection valves for directly injecting fuel into a plurality of cylinders, and spark plugs for igniting fuel in said respective cylinders, said starting device comprising:

piping for connecting between said respective cylinders;

communication control valves for controlling the states of communication between said respective cylinders and said piping;

an electronic engine control unit for controlling said starting device;

a crank angle detector for detecting the crank angle of a crankshaft of said internal combustion engine; and a compression/expansion identification part for identifying the compression stroke or the expansion stroke of each of said cylinders;

wherein said electronic engine control unit includes:

a basic operation control part for controlling said fuel injection valves and said spark plugs;

a stroke identification part for identifying the stroke of each of said cylinders from said crank angle position and an identification result of the compression stroke or the expansion stroke of each cylinder; and a communication state control part for controlling said communication control valves; and wherein in a cylinder which is identified to be on the expansion stroke by said stroke identification part, fuel is injected into said expansion stroke cylinder and ignited therein under the control of said electronic engine control unit, and said expansion stroke cylinder is placed in communication with a cylinder on the exhaust stroke by means of said communication state control part for a prescribed period of time after the ignition thereof, after which said expansion stroke cylinder is further placed in communication with a cylinder on the compression stroke for a prescribed period of time.

2. The starting device for an internal combustion engine according to claim 1, wherein in said expansion stroke cylinder identified by said stroke identification part, fuel is injected thereinto and ignited therein under the control of said electronic engine control unit, and thereafter said expansion stroke cylinder is placed into communication with said exhaust stroke cylinder for a prescribed period of time by means of said communication state control part, and then further placed into communication with said compression stroke cylinder for a prescribed period of time, so that fuel is again supplied to said expansion stroke cylinder and ignited therein under the control of said electronic engine control unit.

* * * * *